United States Patent
Rotharmel (10) Patent No.: US 10,266,091 B2
(45) Date of Patent: Apr. 23, 2019

(54) EXTERIOR VEHICULAR REFRIGERATION DEVICE

(71) Applicant: Shane M. Rotharmel, Shreveport, LA (US)

(72) Inventor: Shane M. Rotharmel, Shreveport, LA (US)

(73) Assignee: ICBX, LLC, Shreveport, LA (US)

( * ) Notice: Subject to any disclaimer, the term of this patent is extended or adjusted under 35 U.S.C. 154(b) by 0 days.

(21) Appl. No.: 15/667,621

(22) Filed: Aug. 2, 2017

(65) Prior Publication Data

US 2018/0037150 A1 Feb. 8, 2018

Related U.S. Application Data

(60) Provisional application No. 62/369,952, filed on Aug. 2, 2016.

(51) Int. Cl.

| | |
|---|---|
| *B60N 3/10* | (2006.01) |
| *B60H 1/24* | (2006.01) |
| *F25D 23/00* | (2006.01) |
| *F25D 23/10* | (2006.01) |
| *B60H 1/00* | (2006.01) |
| *B60P 3/00* | (2006.01) |

(52) U.S. Cl.
CPC ........... *B60N 3/10* (2013.01); *B60H 1/00264* (2013.01); *B60H 1/241* (2013.01); *F25D 23/003* (2013.01); *F25D 23/10* (2013.01); *B60H 1/00* (2013.01); *B60H 2001/00228* (2013.01); *B60P 3/00* (2013.01)

(58) Field of Classification Search
CPC ...... B60N 3/10; B60H 1/00264; B60H 1/241; B60H 2001/00228; B60H 1/00; B60H 1/00014; F25D 23/10; F25D 23/003; F25D 19/00; F25D 11/003; B60P 3/00
See application file for complete search history.

(56) References Cited

U.S. PATENT DOCUMENTS 4,637,222 A * 1/1987 Fujiwara ................ B60N 3/103
62/244

FOREIGN PATENT DOCUMENTS

JP 2000105045 A * 4/2000

* cited by examiner

*Primary Examiner* — Emmanuel Duke
(74) *Attorney, Agent, or Firm* — Davis & Bujold, P.L.L.C.; Charles Holoubek (57) ABSTRACT

A vehicle mounted refrigeration device comprising an outer shell, an inner shell nested in the outer shell, one or more heat sink plates attached to the inner shell, one of an insulating material and a vacuum spacing the inner shell from the outer shell, a control unit, and a compressor mounted to a vibration isolator.

18 Claims, 10 Drawing Sheets

EXTERIOR VEHICULAR REFRIGERATION DEVICE

CROSS REFERENCE TO RELATED APPLICATIONS/PRIORITY

The present invention claims priority to U.S. Provisional Patent Application No. 62/369,952 filed Aug. 2, 2016, which is incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

BACKGROUND OF THE INVENTION

Drivers of pickup trucks often use their trucks for jobs, and desire cold beverages and foods at their jobsite. Current methods to have and maintain cold perishables for pickup truck drives takes up cabin room, are cumbersome, required added ice, or are otherwise inconvenient and/or ineffective.

SUMMARY OF THE INVENTION

Wherefore, it is an object of the present invention to overcome the above mentioned shortcomings and drawbacks associated with the current technology. The present invention is directed to methods and devices that satisfy the above shortcomings and drawbacks.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40% means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Turning now to FIGS. 1-10, a brief description concerning the various components of the present invention will now be briefly discussed. As can be seen in this embodiment, the refrigeration device 2 includes an outer shell 4, and inner shell 6, a heat sink plate 8, a refrigerant circuit 10, a compressor unit 12, and a control unit 14. The refrigeration device designed to be carried in the exterior of a vehicle 16, preferably a pickup truck bed 18, and preferably able to be exposed to the elements while maintaining proper functionality. Additional embodiments could be used on side by side carriers of ATVs, for example OUTER SHELL: The outer shell 4 preferably resembles a pickup truck type tool box in shape and size. In one embodiment, the outer shell 4 has a width 20 of approximately 56 inches, a depth 22 of approximately 21 inches, and a height 24 of approximately 21 inches. The outer shell 4 is preferably constructed of a thermal conductive material such as metals, including steel and aluminum. In the embodiment shown the outer shell 4 is made from $\frac{1}{16}$ inch thick stainless steel, but other thicknesses are possible. Preferable thicknesses are between $\frac{1}{64}$ and $\frac{1}{2}$ inch thick, more preferably between $\frac{1}{32}$ and $\frac{1}{4}$ inch thick, and most preferably between $\frac{3}{64}$ and $\frac{1}{8}$ inch thick. The outer shell 4 connects the refrigeration device 2 to the vehicle 16 and supports and protects the interior parts of the refrigeration device 2 from the elements.

The outer shell 4 has a base 26, a front wall 28, a back wall 30, a first side wall 32—normally oriented on the driver's side of the vehicle, a second side wall 34—normally oriented on the passenger's side of the vehicle, and a top 36. In the embodiment shown, an exterior portion 38 of an access door 40 forms the outer shell top 36, that when opened provides access to the interior of the refrigeration device, including the refrigeration compartment 42. In other embodiments, the front wall 28, for example, could additionally or alternatively include an access door 40, or multiple adjacent access doors 40 could form the outer shell top 36.

The outer surface 44 of the outer shell 4 preferably contains a coating to aid in weather resistance. The coating preferably enhances or maintains a high thermal conductivity in the outer shell 4.

The inner surface 46 of the outer shell 4 is preferably lined with a layer of insulation 46. In the embodiment shown, a layer of aerogel insulation 48 is directly attached to substantially all of the outer shell inner surface 46.

The embodiment shown the outer shell 4 has a shelf 50 on the outer shell first side wall 32 and the outer shell second side wall 34, but in other embodiments the shelves 50 may be omitted, and the outer shell 4 could have, for example, a rectangular prism or box shape.

An electric port or socket 52 is positioned in the outer shell back wall to carry electric power from the vehicle 16 to the refrigeration device 2. Internal wiring 54 carries the electric power from the socket 54 to the control unit 14 and the compressor unit 12, for example.

INNER SHELL: The inner shell 6 fits within and is supported by the outer shell 4. The inner shell 6 provides a clean, water proof, and easily sanitized environment for cold storing materials 56 such as food and beverages. The inner shell 6 has a base 58, a front wall 60, a back wall 62, a first side wall 64—normally oriented on the driver's side of the vehicle, a second side wall 66—normally oriented on the passenger's side of the vehicle, and a top 68. In the embodiment shown, an interior portion 70 of the access door 40 forms the inner shell top 68.

The inner shell 6 is preferably constructed from a ridged material, such as metal or plastic. In the embodiment shown, the inner shell 6 is constructed of $\frac{1}{8}$ inch thick aluminum sheet metal. In preferred embodiments, the inner shell is comprised of materials, like aluminum, copper, and steel, that have high thermal conductivity. Preferable thicknesses are between $\frac{1}{64}$ and $\frac{3}{8}$ inch thick, more preferably between $\frac{1}{32}$ and $\frac{1}{4}$ inch thick, and most preferably between $\frac{1}{16}$ and $\frac{3}{16}$ inch thick.

In the embodiment shown, a layer of aerogel insulation 48 is directly attached to substantially all of the outer surface 72 of the inner shell 6. Substantially all of the empty space between the inner shell 6 and the outer shell 4 is preferably filled with foam or other insulation 74, though, in other embodiments, all of the gas may be removed and sealed and a vacuum may be established and maintained in between the inner shell 6 and the outer shell 4. The access door 40 is also insulated 48, 74 and when closed provides a secure thermal and fluid envelope, thermally insulating the inner shell 6 from the outer shell 4 and the exterior environment.

The inner shell 6 may also have an inner ridge 76, which extends upwards from the inner shell base 58. The inner ridge 76 provides spacing for the compressor unit 12. The inner ridge 76 is preferably placed centrally between the inner shell first and second side walls 64, 66, as this central location may otherwise be hard for the user to reach when trying access stored food and beverages 56 reaching over the side of the truck bed 18. Thus the elevated inner ridge 76 serves at least two functions, placing stored materials 56 in the central location of the inner shell 6 in a more accessible location, and providing space for the compressor unit 12.

Figure 1:
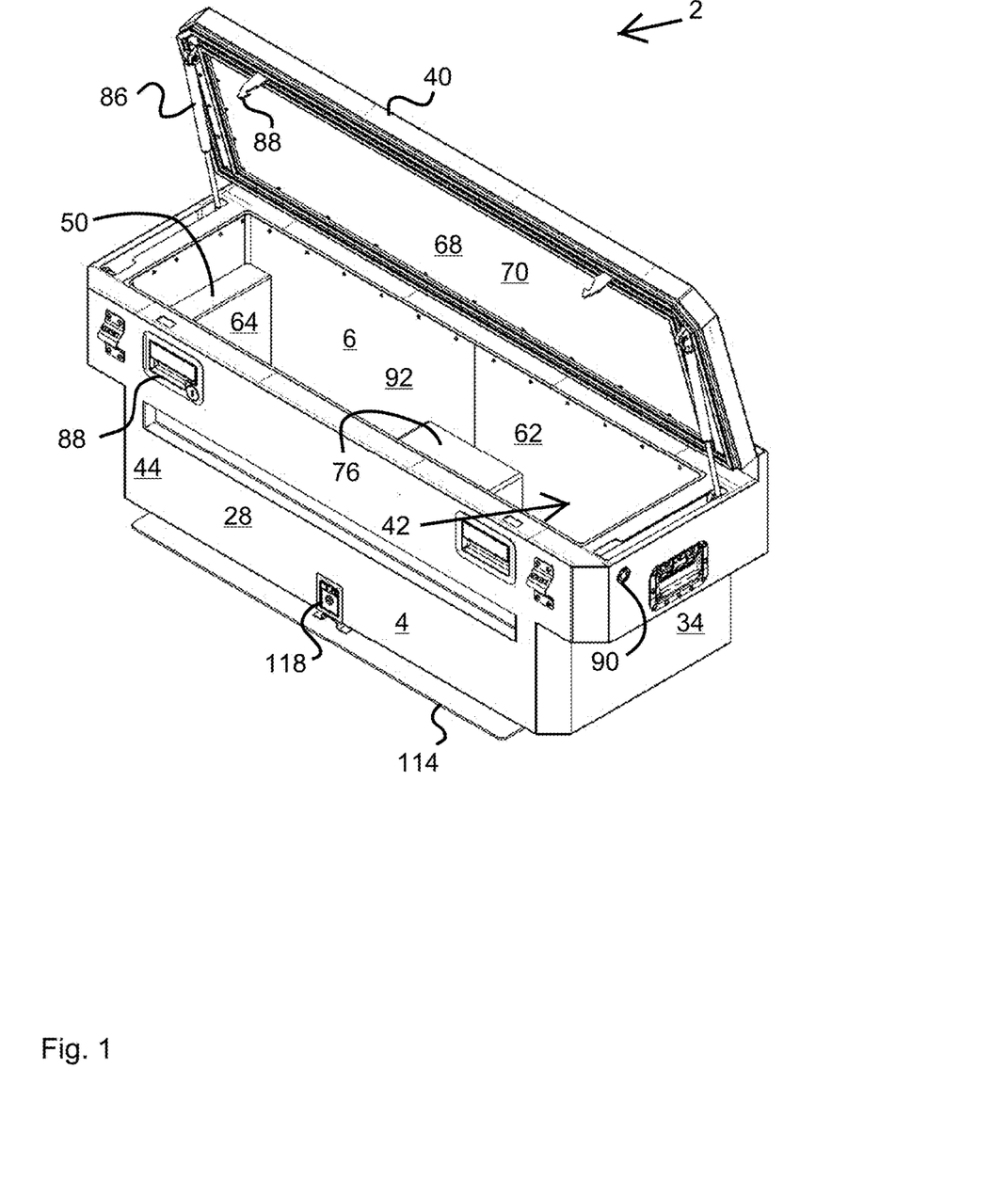
FIG. 1 is an isometric view of a refrigeration device according to the present invention, with a top access door in an open position.
Figure 2:
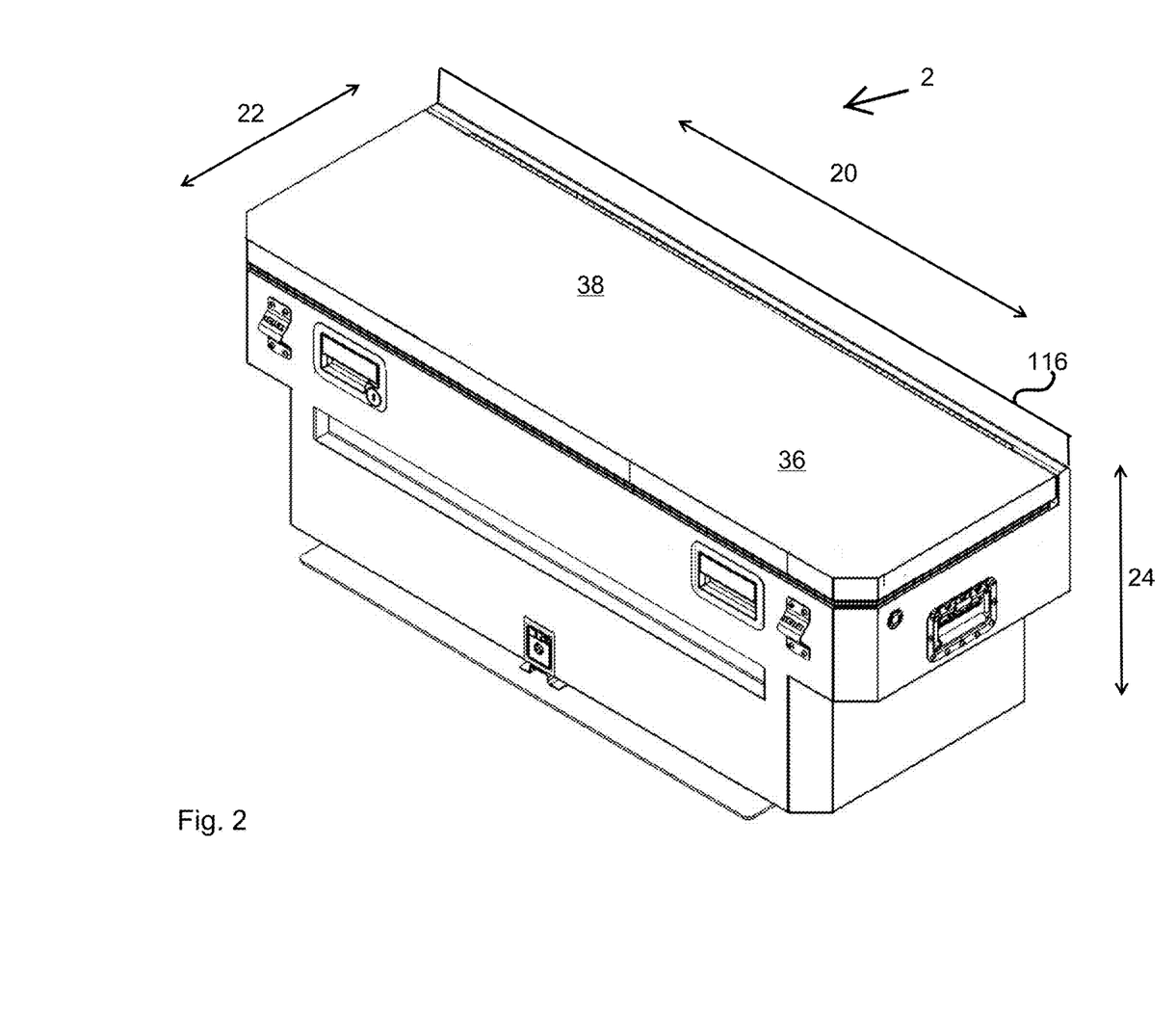
FIG. 2 is a isometric view of the refrigeration device of FIG. 1, with the access door in a closed position and with an optional vertical fin.
Figure 3A:
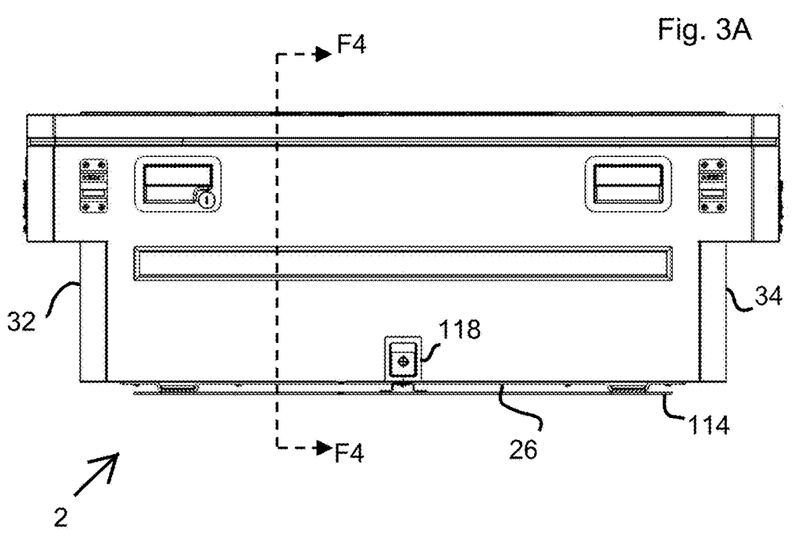
FIG. 3A is a front plan view of the refrigeration device of FIG. 1, with the access door in the closed position.
Figure 3B:
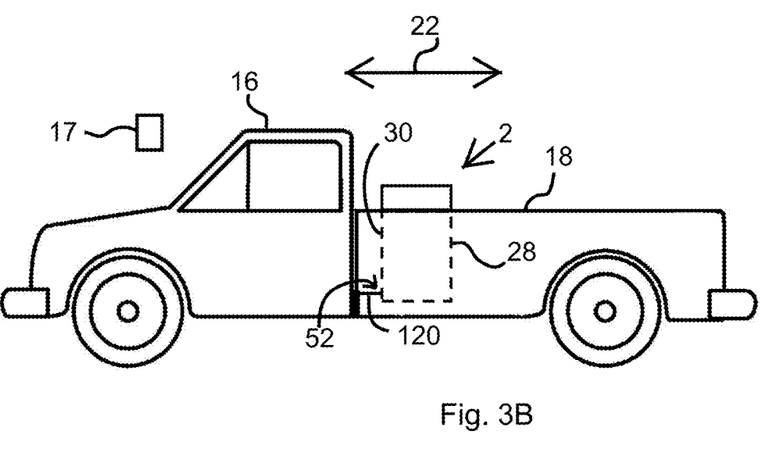
FIG. 3B is a schematic side plan view of the refrigeration device of FIG. 1 mounted in the bed of a pickup truck.
Figure 4:
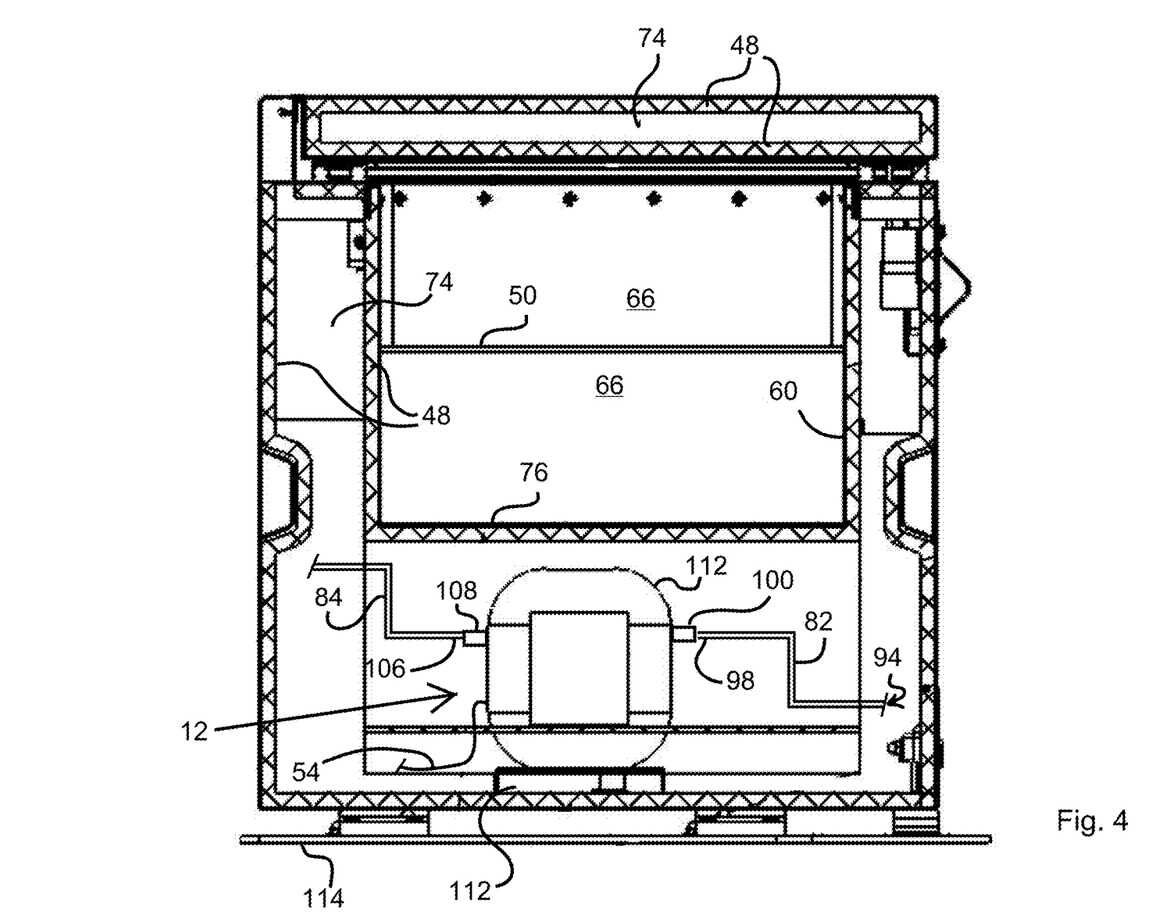
FIG. 4 is a cross section view of refrigeration device of FIG. 3A along the F4 view line.
Figure 5:
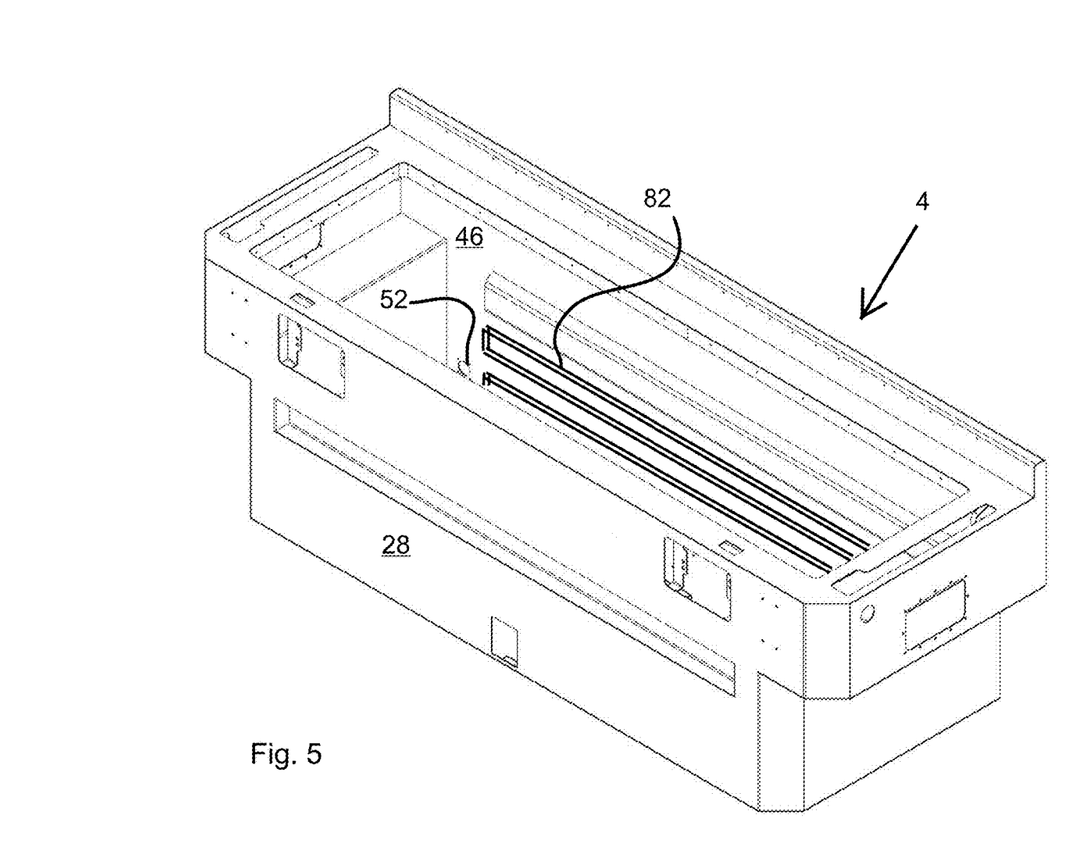
FIG. 5 is an isometric view of the outer shell of the refrigeration device of FIG. 1, with the top removed.
Figure 6:
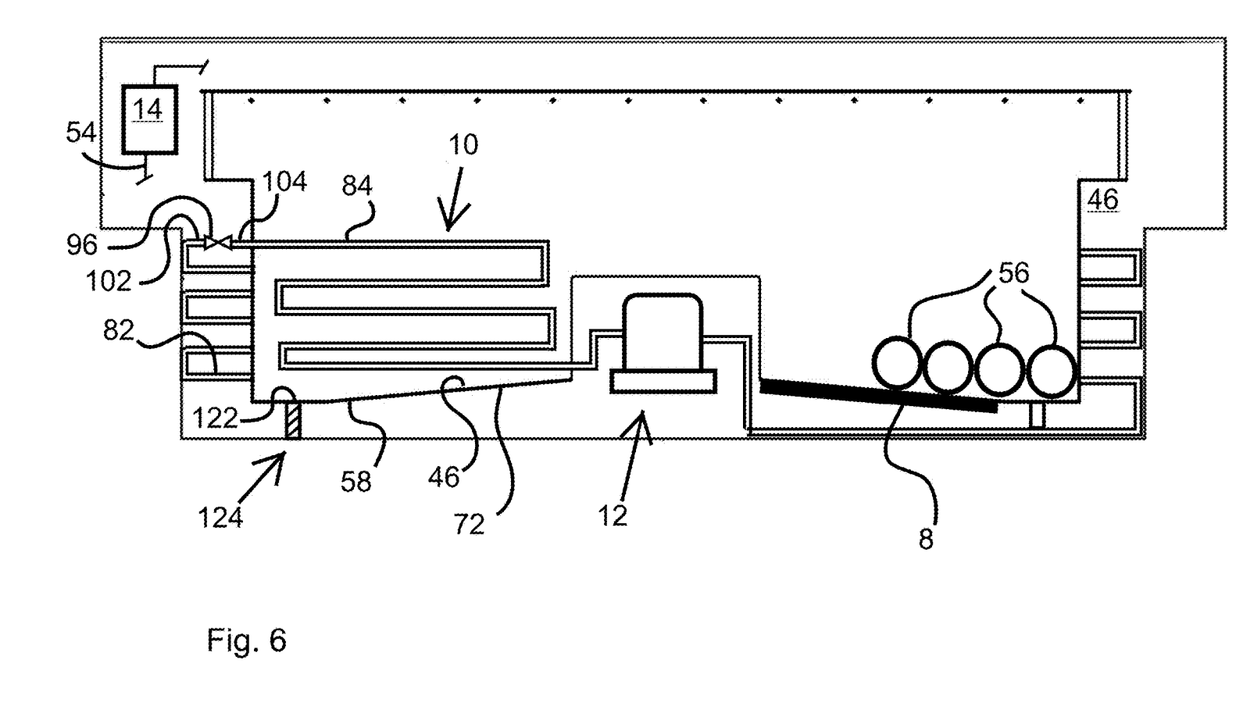
FIG. 6 is a schematic cross sectional view of the refrigeration device of FIG. 1, with the top removed.
Figure 7:
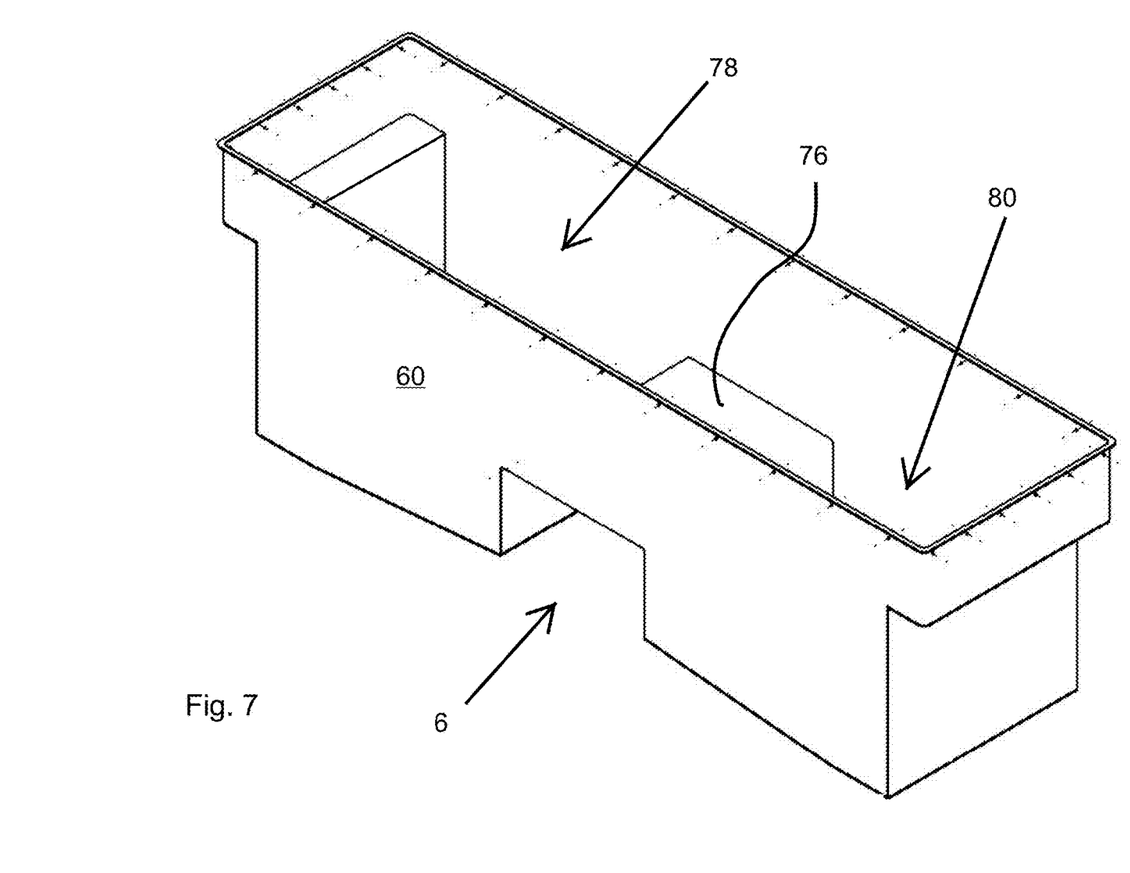
FIG. 7 is an isometric view of the inner shell of the refrigeration device of FIG. 1, with the top removed.
Figure 8A:
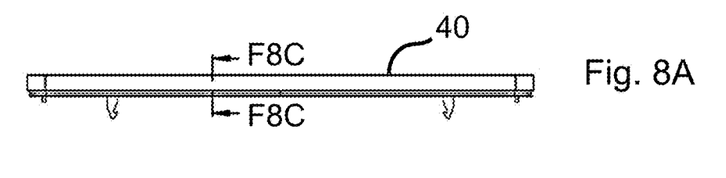
FIG. 8A is a front plan view of the top access door refrigeration device of FIG. 1.
Figure 8B:
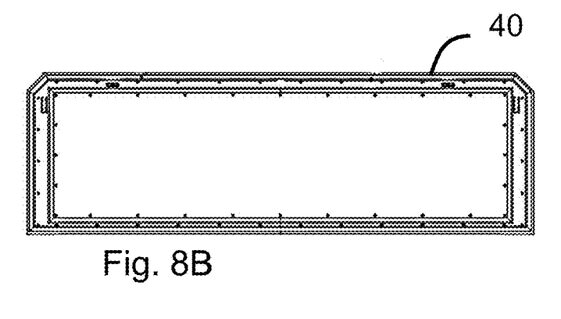
FIG. 8B is a bottom plan view of the top access door of FIG. 8A.
Figure 8C:
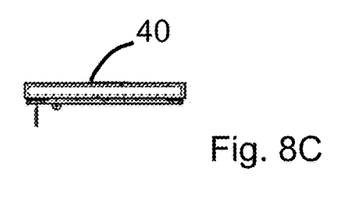
FIG. 8C is a sectional view of the top access door of FIG. 8A along the F8C view line.
Figure 8D:
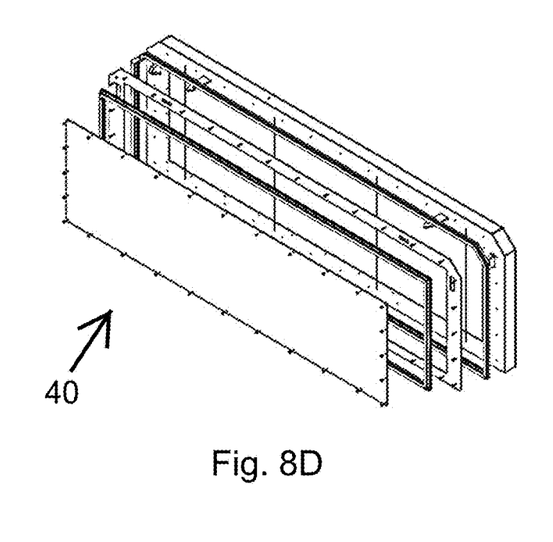
FIG. 8D is an isometric exploded view of the top access door of FIG. 8A.
Figure 9:
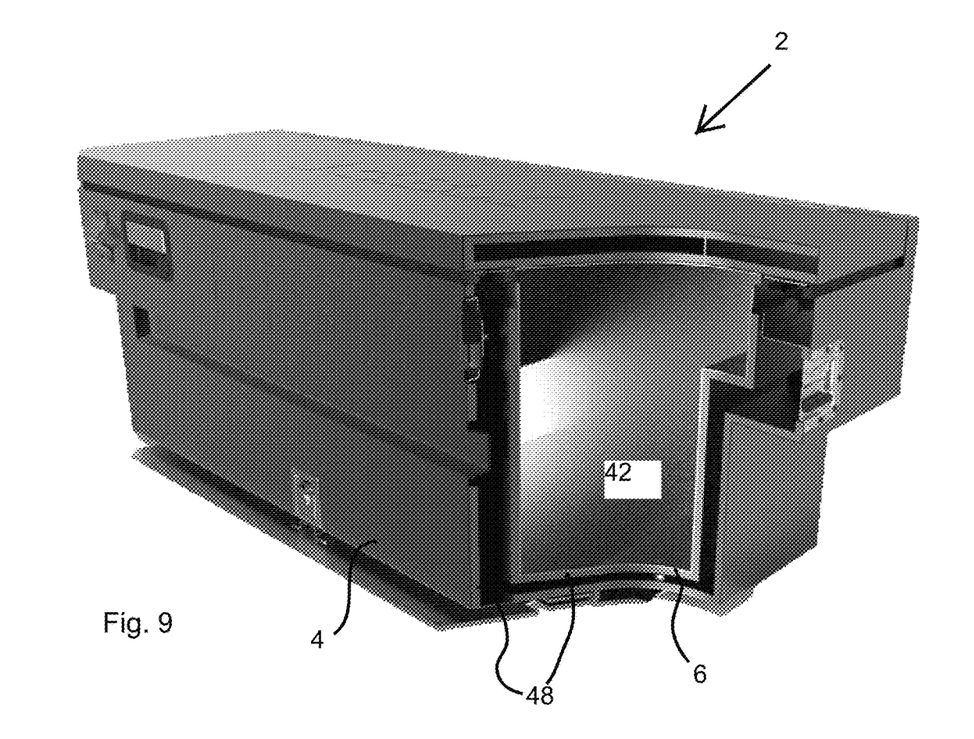
FIG. 9 is a partially sectional solid view of the refrigeration device of FIG. 1.
Figure 10:
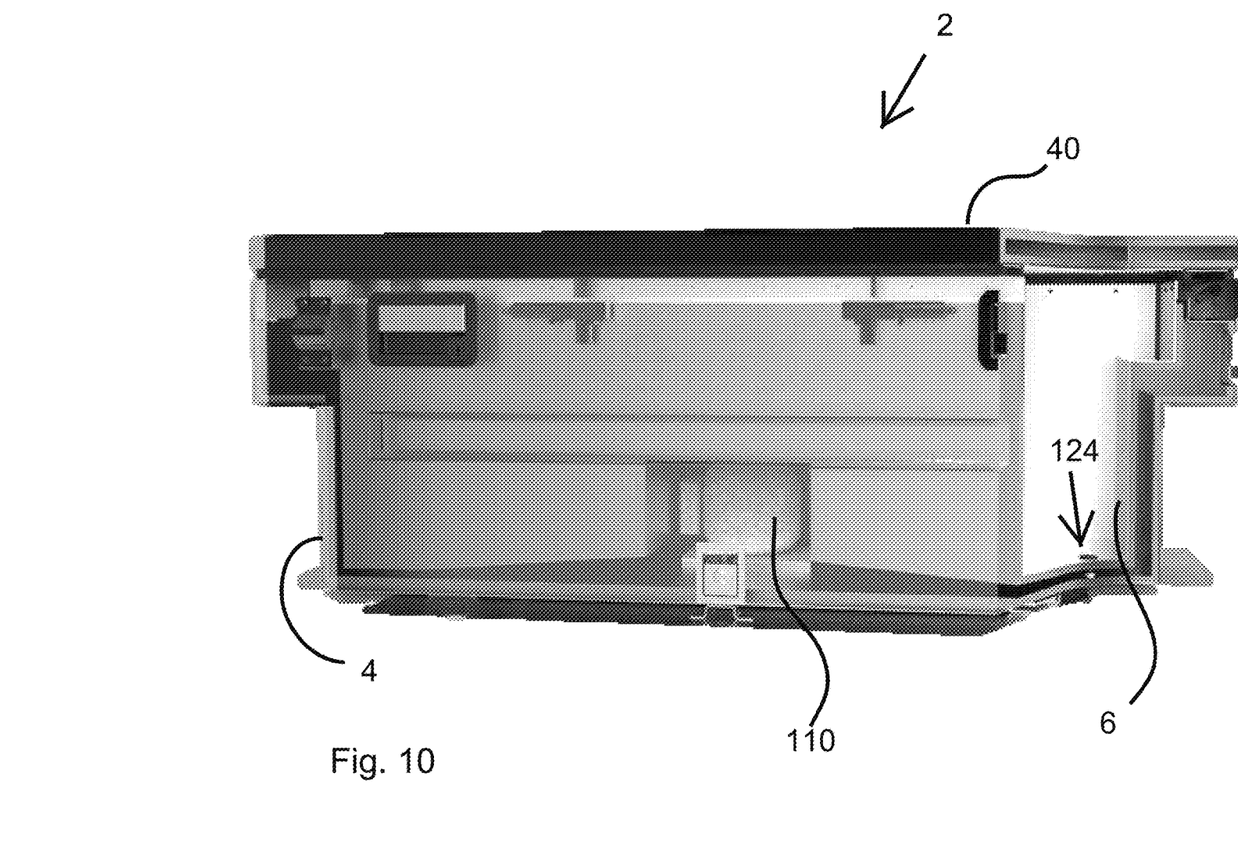
FIG. 10 is a partially section solid view of refrigeration device of FIG. 1, with the front wall of the outer shell partially see through to show some detail of the inside of the refrigeration device.

On either side of the inner ridge 76 are first and second concavities 78, 80. The inner shell base 58 in the first and second concavities 78, 80 preferably slopes downward toward respective the inner shell first and second walls 64, 66. The pitch of the slope to the horizontal is preferably greater than 1.5%, more preferably greater than 5%, most preferably greater than 10%. In embodiments where present, the pitch can extend the entire width 20 of the inner shell base 58 in the respective concavity 78, 80, or, as shown in FIG. 6, may extend over just a portion or majority of the width 20 of the inner shell base 58. Where present, the pitch serves multiple functions. First, through gravity, the pitch urges cold stored material 56 like food and canned beverages away from the middle of the refrigeration device 2 and toward the sides 32, 34 of the refrigeration device 2, to be more easily accessed by users from the side of the vehicle 16. Second, stored materials 56, like canned beverages are less likely to roll freely about the inner shell base 58 as the vehicle 16 is driven, as the stored materials must overcome gravity in addition to friction. In a further embodiment, the inner shell base 58 may alternatively or additionally pitch downward, with similar slopes with respect to the horizontal, toward the inner shell front wall 60 or the inner shell back wall 62 (or in some embodiments, from a raised mid-depth location in the inner shell base 58, pitch downward toward the inner shell front and back walls 60, 62). A benefit of an embodiment where the inner shell base 58 pitches downward toward both a side wall 64, 66 and the front wall 60 or back wall 62 is that stored materials 56 are even less likely to move about the respective concavity 78, 80 as the vehicle 16 moves and turns, because the stored material 56 would have to work against gravity to move in any direction.

According to additional embodiments, various shapes are envisioned for the outer shell 4. The inner and outer shells 6, 4 could additionally be formed with plastic, fiberglass or other metals or alloys. In embodiments with shells 4, 6 having lower thermal conductivity, alternative designs to using the respective shell 4, 6 as a thermal conductor for respective condenser or evaporator tubing 82, 84 would preferably be used.

ACCESS DOOR: The access door 40 in the embodiment shown functions as the outer shell top 36 and the inner shell top 68. The access door 40 shown is pivotly attached to the outer shell back wall 30, preferably with gas assist opening cylinders 86. The access door 40 additionally has locking mechanism, such as locking latches 88 along the outer shell front wall 28 to secure the access door 40 in a closed position. The locking latches 88 are preferably manually unlocked and disengaged with a key or other secure access mechanisms. The access door is also preferably has a push button opening mechanism 90 on one or both of the first and second outer shell side walls 32, 34, for easy access by the user from the side of a pickup truck bed 18.

HEAT SINK PLATE: Within the inner shell 6, attached to the outer surface of the inner shell 72, the inner surface of the inner shell 92, and/or forming all, or part of one or more wall, top, and or base of the inner shell 60, 62, 64, 66, 68, 58 is one or more heat sink plates 8 of steel and/or heat sink materials that acts as a sink to absorb heat. Steel and aluminum are preferable heat sink plate 8 materials as they both have a high volumetric heat capacity and a high thermal conductivity, which allows the heat sink plate 8 to quickly dissipate heat (get cold) and yet require a large amount of additional heat energy to increase temperature. Other high volumetric heat capacity materials that could be used as a material for a heat sink plate 8 would include, for example, Nickel; Inconel 600; Incoloy 800; Monel 400; mild Steel; Stainless Steel, including Stainless Steel 304 and 430; Nichrome (80% NI-20% Cr); Cast Iron; Copper; Aluminum; and Brass (Yellow). The heat sink plate 8 will preferably have a isobaric volumetric heat capacity ($C_{P,v}$) of greater than 2.4 $J \cdot cm^{-3} \cdot K^{-1}$, more preferably greater than 3.0 $J \cdot cm^{-3} \cdot K^{-1}$, and most preferably greater than 3.5 2 $J \cdot cm^{-3} \cdot K^{-1}$. The heat sink plate 8 will also preferably have a high thermal conductivity, to allow quick dissipation of heat energy when the refrigeration device 2 is operating under power to run the compressor unit 12 and circulate refrigerant 94. The heat sink plate 8 will preferably have a thermal conductivity of greater than 45 $W \cdot m^{-1} \cdot K^{-1}$, more preferably greater than 100 $W \cdot m^{-1} \cdot K^{-1}$, most preferably greater than 200 $W \cdot m^{-1} K^{-1}$. Though water, with a volumetric heat capacity of greater than 4 $J \cdot cm^{-3} \cdot K^{-1}$, could be used in some embodiments as a heat sink 8, because it has a low thermal conductivity, in the range of 1.0 $W \cdot m^{-1} K^{-1}$, it is less desirable. Using a heat sink plate 8 with a high thermal conductivity and a high volumetric heat capacity helps to allow the refrigeration compartment 42 to get cool quickly (under power for example) and stay cold for an extended period, including more than 3, 4, and 5 days. This embodiment is advantageous for a vehicle 2 that intermittently charges the vehicle's battery (during internal combustion engine operation) and where power may not be always available for the refrigeration device 2. The time window for cooling is limited, so rapid cooling of the heat sink plate 8 is desired. And, while the vehicle 16 is not running, the non-powered time frame of the refrigeration device 2 is of a potentially extended duration, so the high volumetric heat capacity is desired. With a steel or aluminum heat sink plate 8 the refrigeration compartment 42 will be able to cool quickly and maintain the cold temperature.

In the embodiment shown, the heat sink plate 8 forms the inner shell base 58.

REFRIGERANT CIRCUIT: Refrigeration fluid, working fluid, or refrigerant 94, such as difluoromethane ($CH_2F_2$), pentafluoroethane ($CHF_2CF_3$), R-410A, and R-22, for example, moves to and from the compressor unit 12 via the refrigerant circuit 10. The refrigerant circuit 10 includes condenser tubing 82, a thermal expansion valve 96 or metering device, and evaporator tubing 84. A first end 98 of the high pressure or condenser tubing 82 connects to a high pressure outlet port 100 of the compressor unit. The condenser tubing 82 then runs to and then coils along the inner surface of the outer shell 46. The outer shell 4 acts as a thermal dissipater for the heat in the refrigerant fluid 94. The condenser tubing 84 is preferably directly adjacent to the inner surface of the outer shell 46, preferably along the outer shell base 26, back wall 30, front wall 28, first side wall 32, and/or second side wall 34, or some combination thereof. The condenser tubing 82 is preferably attached to the outer shell 4 with thermally conductive faster, such as solder or welding. The condenser tubing 82 is preferably between the outer shell 4 and the layer of aerogel 48 attached to the outer shell 4, directing substantially all heat transfer from refrigerant 94, through the condenser tubing 84, to the outer shell 4 and not the space between the outer shell 4 and the inner shell 6. Because of the large surface area of the outer shell 6, and preferably its high thermal conductivity, substantially all of the outer shell 4 may act as a thermal dissipater for the condenser tubing 82. In an alternative embodiment, the condenser tubing 82 may coil partially or substantially entirely outside of the outer shell 4, behind the back wall 30 and/or below the base 26, for example.

A second end of the condenser tubing 102 then connects to the thermal expansion valve 96 (also known as a throttle). The refrigerant circuit 10 continues from the thermal expansion valve 96 to a second end of low pressure or evaporator tubing 84. Capillary tubing may be used in place of the thermal expansion valve 96.

The evaporator tubing 84 runs from the thermal expansion valve 96 to the inner shell 6. The evaporator tubing 84 preferably coils directly adjacent the inner or outer surface of the inner shell 92, 72. In embodiments where the inner shell 6 has high thermal conductivity, the inner shell 6 acts as an efficient conductor to pass heat from the interior of the inner shell 6 (the refrigeration compartment 42) to the evaporator tubing 86. In other embodiments, the evaporator tubing 86 may be directly adjacent to the heat sink plates 8, which are themselves adjacent to, within, or form a portion of the inner shell 6. In one embodiment, the evaporator tubing 84 coils within channels in the heat sink plate 8, which forms a portion of the inner shell base 58. The evaporator tubing 84 then runs to the compressor unit 12 and a first end of the evaporator tubing 106 connects to a low pressure inlet port 108 of the compressor unit 12.

In the preferred embodiment, the entire refrigerant circuit 10 is contained within the outer shell 4.

COMPRESSOR UNIT: The compressor unit 12 preferably includes a hermetic or simi-hermetic sealed compressor 110. The pump inside the sealed compressor is preferably mounted on vibration isolators 112. Further, the sealed compressor 110 is itself preferably mounted on a vibration isolator also 112, including, for example a floating platform as to provide a more controlled impact free motion for the compressor 110. Such impact and vibration isolator 112 is advantageous as it helps ensure longevity of the compressor 110 that is being driven over sometimes rough terrain the back of the truck 16. In some embodiments, the compressor 110 is mounted on rubber bushing 112. In additional embodiments, the compressor 110 may be mounted on a Pneumatic or air isolator, mechanical springs, spring-dampers, pads, chords, or sheets of other flexible materials such as elastomers, rubber, cork, dense foam and laminate materials, molded and bonded rubber and elastomeric isolators and mounts, negative-stiffness isolators and/or other vibration isolator 112.

Alternatively or in addition to the hermetic compressor 110, various other refrigeration systems may be used in the refrigeration device 2, including thermoelectric cooling and/or magnetic refrigeration.

The compressor 110 could be made in a 12 volt dc model forgoing an inverter and potentially simplifying the compressor unit 12 design.

CONTROL UNIT: The control unit 14 preferably includes a computer processor, an input, an output, memory, and sensors to monitor the internal temperature of the inner shell 6, the outer sell 4 temperature, ambient external air temperature, input voltage, motion, acceleration, open or closed status of access door(s) 40, engaged or disengaged status of locks 88, and GPS location. The control unit 14 is preferably programmed to manage electricity that is drawn from the vehicle 16 as not to overly drain the power of a vehicle 16 in a way that would leave the vehicle 2 stranded. The control unit 14 could also communicate wirelessly with the user's smart phone or other mobile device 17 wirelessly directly, via Bluetooth or wi-fi for example, and/or indirectly through cellular networks. One embodiment would use a web/internet user interface for the user to control the temperature and settings, open, close, lock and unlock, and otherwise communicate with the control unit 14 of the refrigeration device. A cellular antenna and other hardware are preferably included within the refrigeration device for wireless communication. The control unit 14 could also notify the owner by text, email, or other method if the refrigeration compartment 42 rose above a predetermined temperature, or some other potential error state, such as if the truck 16 was moving and the access door 40 of the refrigeration device 2 was left open. The control unit 14 could also communicate with the vehicle 16, either wired or wirelessly, and transmit status and error messages that could be displayed to the user via vehicle sounds, displays, and other outputs. The control unit 14 could preferably also open, close, lock, and unlock the access door as directed by the user either directly or remotely, with associated actuators being included as needed to allow such mechanical movement. The control unit 14 could also automatically lock the access door 40 in certain situations, such as when the control unit 14 detects the vehicle 16 is in motion, when the vehicle 16 is turned off, and the access door 40 has not be opened after a set amount of time—for example, 30 minutes, one hour, or three hours.

The control unit 14 controls and accepts 12 volt power from the vehicle 16 and preferably converts it to 120 volt power for the compressor 110, inverting with an inverter if needed. According to further embodiments the refrigeration device 2 electronics and compressor may run on 12 volt power also.

Exemplary programming of the refrigeration device 2 follows. Inputs could include inner shell 6 temperature, outer shell 4 temperature, ambient external air temperature, input voltage, motion, acceleration, open or closed status of access doors 40, and GPS location. Various types of operation include off, fridge (cool to 33° F., for example), freeze (cool to 10° F. for example), custom (chose temp to cool to), timer/runtime (choose time power-off), and scheduled start-up (choose a time to begin cooling).

One power management option would be to turn off power to the refrigeration device 2 if the vehicular voltage drops below 11.8 volts. According to additional embodiments, the control unit 14 would preferably automatically shut down/turn off the refrigeration device 2 if the voltage from the vehicle 16 drops below 11.6 volts, more preferably below 11.4 volts, and most preferably below 11.2 volts.

The control unit 14 is programmed to manage power consumption, control temperature and provide an interface to communicate with the user both directly (with input and output, such as screens, buttons, and sounds) and using Wi-Fi, radio, blue tooth, or other wireless means of communication.

ADDITIONAL PARTS: Attached to the underside of the outer shell base 26 of the outer shell is an elevation bracket 114. The elevation bracket 114 both secures the refrigeration device 2 to the vehicle 16, and also provides spacing to allow air to circulate underneath the refrigeration device 2. This aids in heat transfer from the refrigeration device 2 to the outside environment when the condenser tubing 82 is coiled along the inner surface 46 of the outer shell base 26. In further embodiments, an additional vertical fin 116 extending generally vertically upward from an upper back edge of the top 36 of the refrigeration device 2 may be used to direct, collect, and route an increased amount of air along the outside of the outer shell back wall 30 and under the refrigeration device 2 while the vehicle 16 is moving in a forward direction. Other air capture and routing elements may be attached to the outer shell 4 to increase air movement around the refrigeration device 2 as the vehicle 16 moves. The elevation bracket 114 is preferably secured to the truck bed 18 with bolts or other mechanical or chemical fasteners. The outer shell 4 preferably is lockably received by and secured to the elevation bracket 114. In this manner, the refrigeration device 2 is securely attached to the truck bed 18 in all directions, but, by unlocking the elevation bracket lock 118, and disconnecting the power cord 120 from the socket 52, the refrigeration device 2 may be readily carried out of the truck bed 18 and ported to a separate location as desired, for example where access to the food and drink is desired but where the truck 16 cannot readily go, such as another location on a job site or onto a beach. Afterward, the refrigeration device 2 can be easily placed back into the truck bed 18 onto the elevation bracket 114, the power cord 120 reconnected to the socket 52, and the elevation bracket lock 118 relocked.

In other embodiments, drain spouts 122 may be located in the refrigeration device 2, running from the inner shell base 58 through and out of the outer shell base 26. The drain spouts 122 are preferably normally closed with a drain spout plug 124 at either or both of the inner shell 6 and the outer shell 4 openings. In embodiments where the inner shell base 58 is pitched, the drain spouts 122 are preferably located at or adjacent to a lowest point in the inner shell base 58, such that when the drain spouts 122 are open, it allows water and other fluids to naturally drain to the drain spout openings 122 and out of the refrigeration device 2.

According to a further embodiment, not shown, the refrigeration device 2 is combined with a non-refrigerated compartment that functions as a tool box. The inner shell 6 would be only approximately a half or other fractional width of the outer shell 4, with the remaining width being occupied by the tool box portion. Two access doors 40 would preferably be provided, one each for the refrigerated compartment 42 and the non-refrigerated compartment, and each preferably separately latchable and lockable, with push button releases 90 on each respective side wall 32, 34. For example, if the refrigerated compartment 42 occupies the driver's side of the refrigeration device 2 and the non-refrigerated compartment occupies the passenger's side, then the refrigerated compartment access door 40 would preferably have a push button release 90 on the first side wall 32 of the outer shell 4 and the non-refrigerated compartment access door 40 would preferably have a push button release 90 on the second side wall 34 of the outer shell 4. The refrigerated compartment 42 is preferably fully insulated from non-refrigerated compartment. The non-refrigerated compartment preferably has a second inner shell, but in other embodiments it could be defined by just the outer shell 4. Condenser tubing 82 may still coil along portions of the inner surface 46 of the outer shell 4 that enclose the non-refrigerated compartment, taking advantage of the heat transfer potential of the larger surface area of the outer shell 4, but the condenser tubing 82 may also be limited to the area under and around the refrigerated compartment 42 portion of the refrigeration device 2. The evaporative tubing 84 is preferably coiled only in, adjacent, or around the inner shell 6 that defines the refrigerated compartment 42 and not the non-refrigerated compartment.

In a further variation of the refrigeration device 2, the refrigeration device 2 may have two separate, preferably separately accessible, and separately controllable refrigerated compartments 42. A larger compartment may be a cooling compartment and a smaller compartment may be a freezer compartment. This supplies increased functionality for the refrigeration device 2, though it may sacrifice space if primarily cooling and not freezing is desired by the user. A parallel evaporator circuit 84 could separately cool the two refrigerated compartments 42, with the parallel evaporator circuit 84 branching after the thermal expansion valve 96 and rejoining before the compressor unit 12. An additional valve or valves may be located in the evaporator circuit 84 to variably and controllably direct refrigerant 94 to one or the other refrigeration compartments 42 as desired by the user. While the two refrigeration compartments 42 preferably have separate access doors 40, they may share a common access door 40.

An exemplary method of construction of one embodiment of the refrigeration device 2 is as follows. The outer shell 4 is cut out of a single or multiple pieces of various styles of sheet metal, such as aluminum or steel. The shape is then folded into a box and the seams are then welded. Copper or steel ¼ inch tubing 82 is spiraled around the inside of the outer shell 4 box, soldered on, and taped over with Metal air conditioner tape. A layer of aerogel 48 is applied onto the inner surface of the outer shell 46, and over the attached condenser tubing 82 where present. The inner shell 6 is cut out of aluminum or stainless steel, for example, and folded into a box and tiged (or welded) at the corners. ¼ inch steel heat sink plates 8 are glued or welded to the exterior surface of the inner shell 72. ⅜ inch steel of copper tube 84 is wrapped around the exterior surface the inner shell 72, and soldered thereto. A layer of aerogel 48 is applied onto the outer surface of the inner shell 72, and over the attached evaporator tubing 82 where present. The inner shell 6 is placed inside the outer shell 4, either suspended or spaced from the outer shell with one or more non-thermal conducting spacers. Foam insulation 74 is sprayed in the gap between the inner and outer shells 6, 4, expanding to fill the gap and securing the inner shell 4. The compressor unit 12 is then placed in a remaining space and the refrigerant circuit 10 with constituent parts is completed. Sensors may be placed in the appropriate locations before the foam 74 is sprayed. The thermal expansion valve 96 and the lines are then soldered to the tubing 82, 84. The control unit 14 is then connected to sensors, the compressor unit 12, and the power source (the vehicle) 52. The finish trim is placed on top.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

Wherefore, I claim:
1. An exterior vehicle refrigeration device comprising:
an outer shell;
an inner shell nested in the outer shell;
one or more heat sink plates attached to the inner shell;
one of an insulating material and a vacuum spacing the inner shell from the outer shell;
a control unit; and
a compressor mounted to a vibration isolator.
2. The refrigeration device of claim 1, where a base of the inner shell slopes toward a side wall of the inner shell.
3. The refrigeration device of claim 1, further comprising an inner ridge in the inner shell, and wherein the compressor is mounted beneath the inner ridge.
4. The refrigeration device of claim 1 further comprising a refrigerant circuit.
5. The refrigeration device of claim 4 where a condenser tubing of the refrigerant circuit is adjacent to the outer shell.
6. The refrigeration device of claim 4 where a condenser tubing of the refrigerant circuit is directly adjacent to an inner surface of the outer shell.
7. The refrigeration device of claim 6 where a layer of aerogel insulation covers the inner surface of the outer shell and the condenser tubing.
8. The refrigeration device of claim 6 where the condenser tubing is directly adjacent to an inner surface of one of a base of the outer shell and a back wall of the outer shell.

9. The refrigeration device of claim 8 where the condenser tubing is directly adjacent to the inner surface of both the base of the outer shell and the back wall of the outer shell.

10. The refrigeration device of claim 4 where a condenser tubing of the refrigerant circuit contained completely within the outer shell.

11. The refrigeration device of claim 4 where an evaporative tubing of the refrigerant circuit coils adjacent to the inner shell.

12. The refrigeration device of claim 11 where a layer of aerogel insulation covers the outer surface of the inner shell.

13. The refrigeration device of claim 1 wherein the control unit is controlled by a mobile device.

14. The refrigeration device of claim 1 further comprising an elevation bracket that releasable locks the refrigeration device to the vehicle, and spaces a base of the outer shell from the vehicle between 0.25 inches and 2.5 inches.

15. The refrigeration device of claim 1, where a base of the inner shell slopes toward a side wall of the inner shell and toward a front wall or a back wall of the inner shell.

16. The refrigeration device of claim 1 where the control unit turns off the compressor if a voltage from the vehicle drops below 11.8 volts.

17. The refrigeration device of claim 1 where an evaporative tubing of a refrigerant circuit is integrated in the heat sink plate.

18. The refrigeration device of claim 1 where the heat sink plate forms a base of the inner shell, the heat sink plate being one of a different material and or a different thickness from walls of the inner shell.

* * * * *